United States Patent
Zelenin et al.

(10) Patent No.: US 10,489,957 B2
(45) Date of Patent: Nov. 26, 2019

(54) CONTROL SYSTEM FOR VIRTUAL CHARACTERS

(71) Applicant: Mursion, Inc., San Francisco, CA (US)

(72) Inventors: Alex Zelenin, Oakland, CA (US); Brian D. Kelly, Winter Garden, FL (US); Arjun Nagendran, San Francisco, CA (US)

(73) Assignee: MURSION, INC., San Francisco, CA (US)

( * ) Notice: Subject to any disclaimer, the term of this patent is extended or adjusted under 35 U.S.C. 154(b) by 0 days.

(21) Appl. No.: 15/344,969

(22) Filed: Nov. 7, 2016

(65) Prior Publication Data

US 2017/0132828 A1     May 11, 2017

Related U.S. Application Data

(60) Provisional application No. 62/251,962, filed on Nov. 6, 2015.

(51) Int. Cl.
    *G06T 13/40*      (2011.01)
    *G06T 7/00*      (2017.01)

(52) U.S. Cl.
    CPC .............. *G06T 13/40* (2013.01); *G06T 7/00* (2013.01)

(58) Field of Classification Search
    USPC ....................................................... 345/473
    See application file for complete search history.

(56) References Cited

U.S. PATENT DOCUMENTS

| | | | |
|---|---|---|---|
| 8,702,507 B2 | 4/2014 | Lansdale et al. | |
| 9,381,426 B1* | 7/2016 | Hughes | H04L 67/06 |
| 2001/0033675 A1* | 10/2001 | Maurer | G06K 9/00228 |
| | | | 382/103 |
| 2006/0224546 A1* | 10/2006 | Ballin | G06F 3/011 |
| | | | 706/62 |
| 2007/0072662 A1 | 3/2007 | Templeman | |
| 2009/0213123 A1 | 8/2009 | Crow | |
| 2009/0231347 A1* | 9/2009 | Omote | G06T 13/205 |
| | | | 345/473 |
| 2010/0156781 A1 | 6/2010 | Fahn | |
| 2010/0267450 A1 | 10/2010 | McMain | |
| 2013/0187929 A1* | 7/2013 | Perez | G06F 3/017 |
| | | | 345/473 |
| 2014/0240324 A1* | 8/2014 | Becker | G06T 13/40 |
| | | | 345/473 |
| 2014/0267313 A1 | 9/2014 | Marsella | |
| 2014/0362091 A1* | 12/2014 | Bouaziz | G06T 13/40 |
| | | | 345/473 |
| 2015/0070351 A1* | 3/2015 | Tarquini | G06T 13/40 |
| | | | 345/419 |
| 2015/0186041 A1 | 7/2015 | Longe et al. | |
| 2015/0301592 A1* | 10/2015 | Miller | G06F 3/011 |
| | | | 345/156 |

(Continued)

FOREIGN PATENT DOCUMENTS

| KR | 20110100856 A | 9/2011 |
|---|---|---|
| WO | 2003058518 A2 | 7/2003 |

*Primary Examiner* — Kimbinh T Nguyen
(74) *Attorney, Agent, or Firm* — Arent Fox LLP

(57) ABSTRACT

A control system provides an interface for virtual characters, or avatars, during live avatar-human interactions. A human interactor can select facial expressions, poses, and behaviors of the virtual character using an input device mapped to menus on a display device.

31 Claims, 14 Drawing Sheets

(56) References Cited

U.S. PATENT DOCUMENTS

| | | | |
|---|---|---|---|
| 2015/0314454 A1* | 11/2015 | Breazeal | B25J 9/0003 |
| | | | 700/259 |
| 2016/0046023 A1* | 2/2016 | Nagendran | B25J 9/1689 |
| | | | 700/248 |
| 2016/0199977 A1* | 7/2016 | Breazeal | B25J 9/0003 |
| | | | 700/246 |
| 2017/0083086 A1* | 3/2017 | Mazur | G06F 3/012 |
| 2017/0206064 A1* | 7/2017 | Breazeal | G06F 8/34 |

* cited by examiner

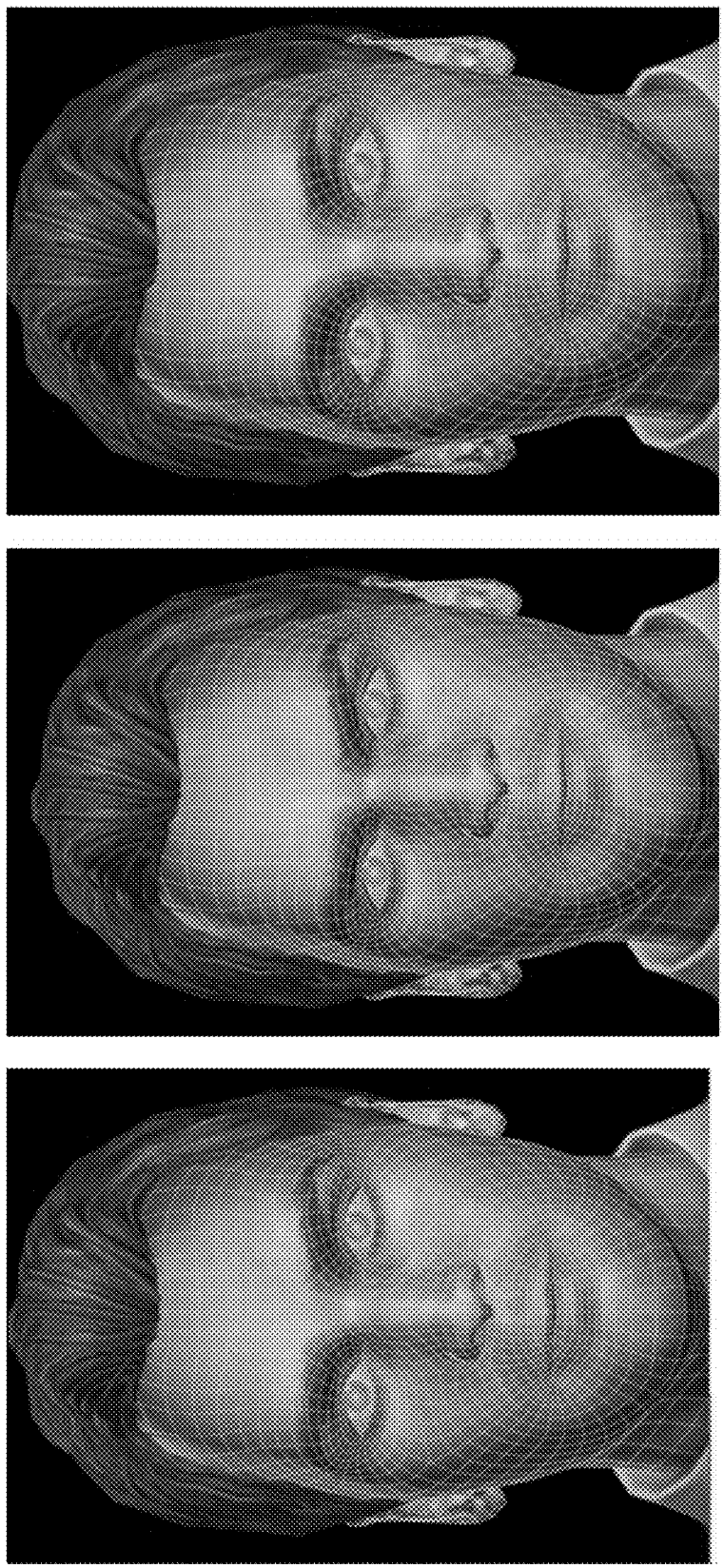

*FIG. 8A*  *FIG. 8B*
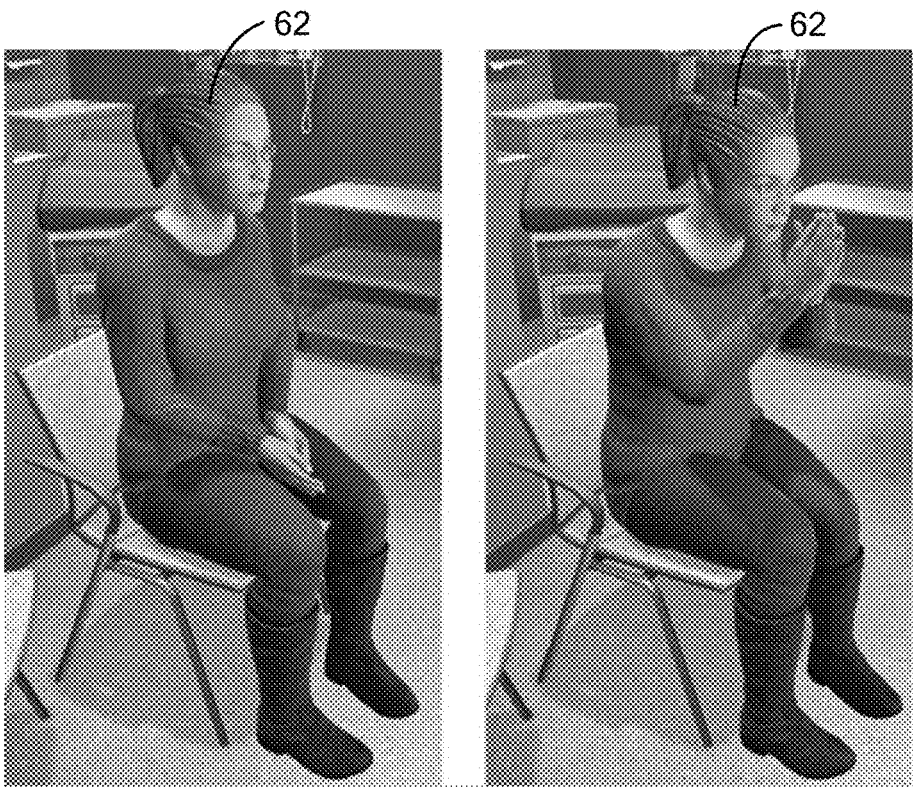
*FIG. 9A*  *FIG. 9B*

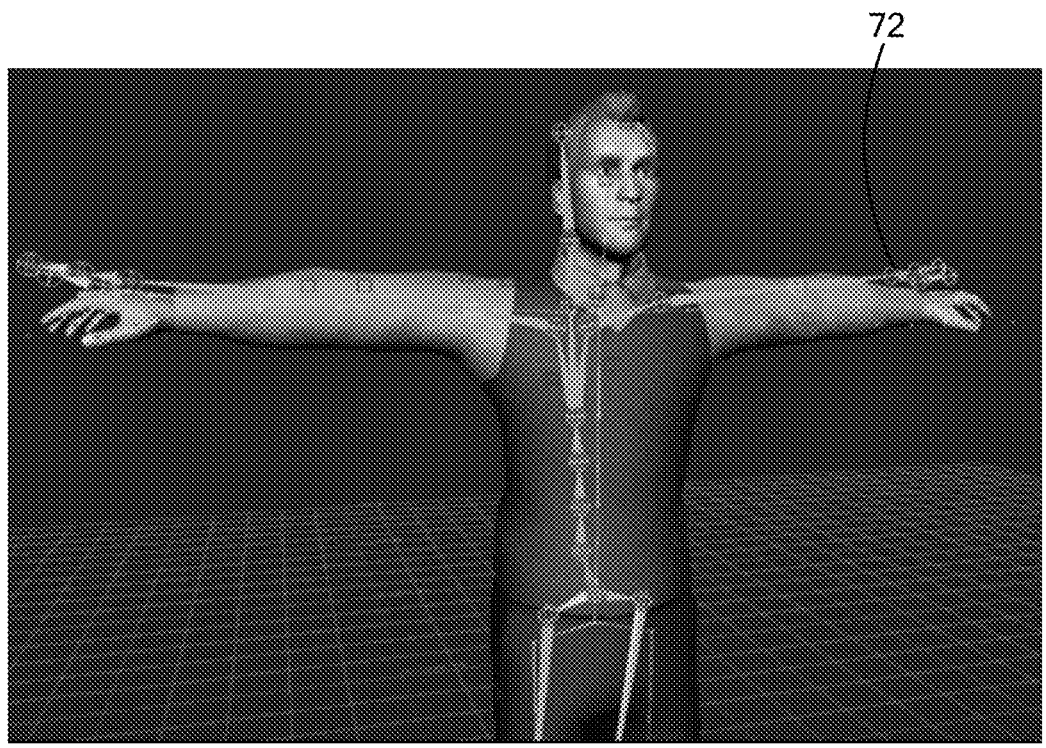
FIG. 12
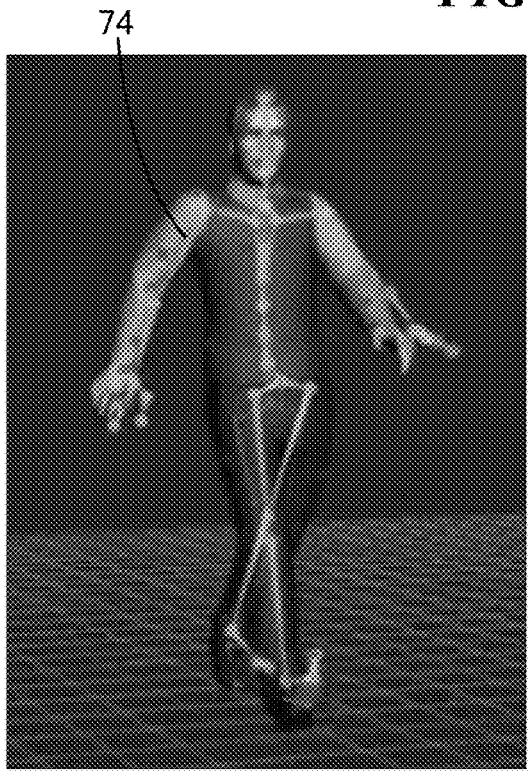 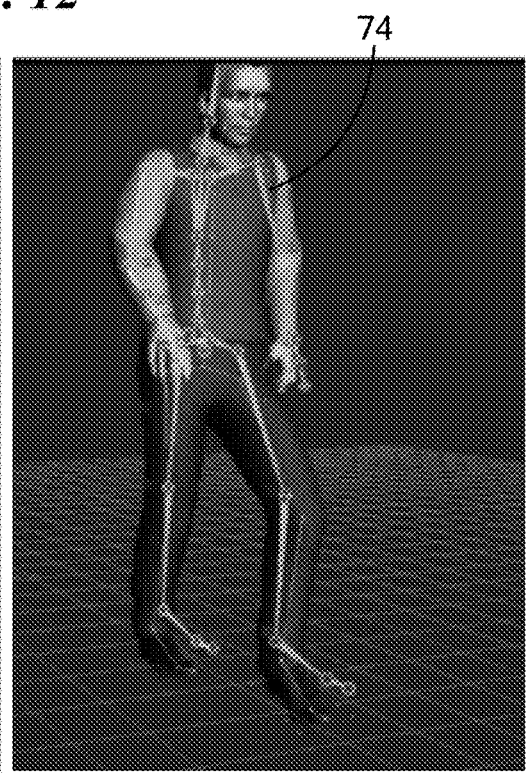
FIG. 13A         FIG. 13B ial Application No. 62/251,962, filed on Nov. 6, 2015, entitled "Control System for Virtual Characters," the disclosure of which is hereby incorporated by reference.

STATEMENT REGARDING FEDERALLY SPONSORED RESEARCH OR DEVELOPMENT

N/A

BACKGROUND

Computer animation of characters or avatars is used in a variety of industries, such as the film industry, advertising, computing gaming, and education. Avatar control is done primarily via full body motion capture and is executed offline. Animations are built and then triggered via computer algorithms (typically called Artificial Intelligence).

SUMMARY OF THE INVENTION

The invention relates to a control system and method for virtual characters or avatars that can be used for live human-avatar interactions. In such live interactions, the avatar can be controlled or embodied by a human user, sometimes called an interactor or an inhabiter. A human-embodied avatar is suited for emotionally complex and sensitive human interactions that cannot be replicated in a scripted AI-driven system. Inclusion of a human in the virtual environment to control the avatar in real time allows another human, such as a trainee, to experience a wider range of human emotions and non-verbal cues in an individualized experience not limited by scripted responses. The inhabited avatar can respond like a real human being in real time.

Control of one or more avatars or virtual characters is achieved with an input device, such as a hand-held controller, that can modify and trigger changes in the appearance and behavioral response of a selected one of the avatars during the live interactions with humans. Control of the avatars' appearance and behavior can be achieved by a combination of digital and analog input mechanisms on the input device.

A number of avatars can be provided, each with a specific cognitive and emotional profile. A human interactor can select one of several avatars at a time and take direct control of the appearance (facial) and behavior (body language) of that avatar.

DESCRIPTION OF THE DRAWINGS

The invention will be more fully understood from the following detailed description taken in conjunction with the accompanying drawings in which:

FIGS. 5A-5C illustrates a 3D avatar model showing several facial expressions determined by deformations of a polygonal mesh;

FIGS. 8A and 8B are still images from a video of a live actor portraying a pose showing hands brought to the face;

FIGS. 9A and 9B are illustrations of a 3D avatar exhibiting the same poses of the live actor of FIGS. 8A and 8B;

FIG. 12 is an illustration of a skeletal frame for an avatar generated from a motion capture video of a human performer exhibiting a behavior;

FIGS. 13A and 13B are still images from a video of an avatar walking;

DETAILED DESCRIPTION OF THE INVENTION

Figure 1:
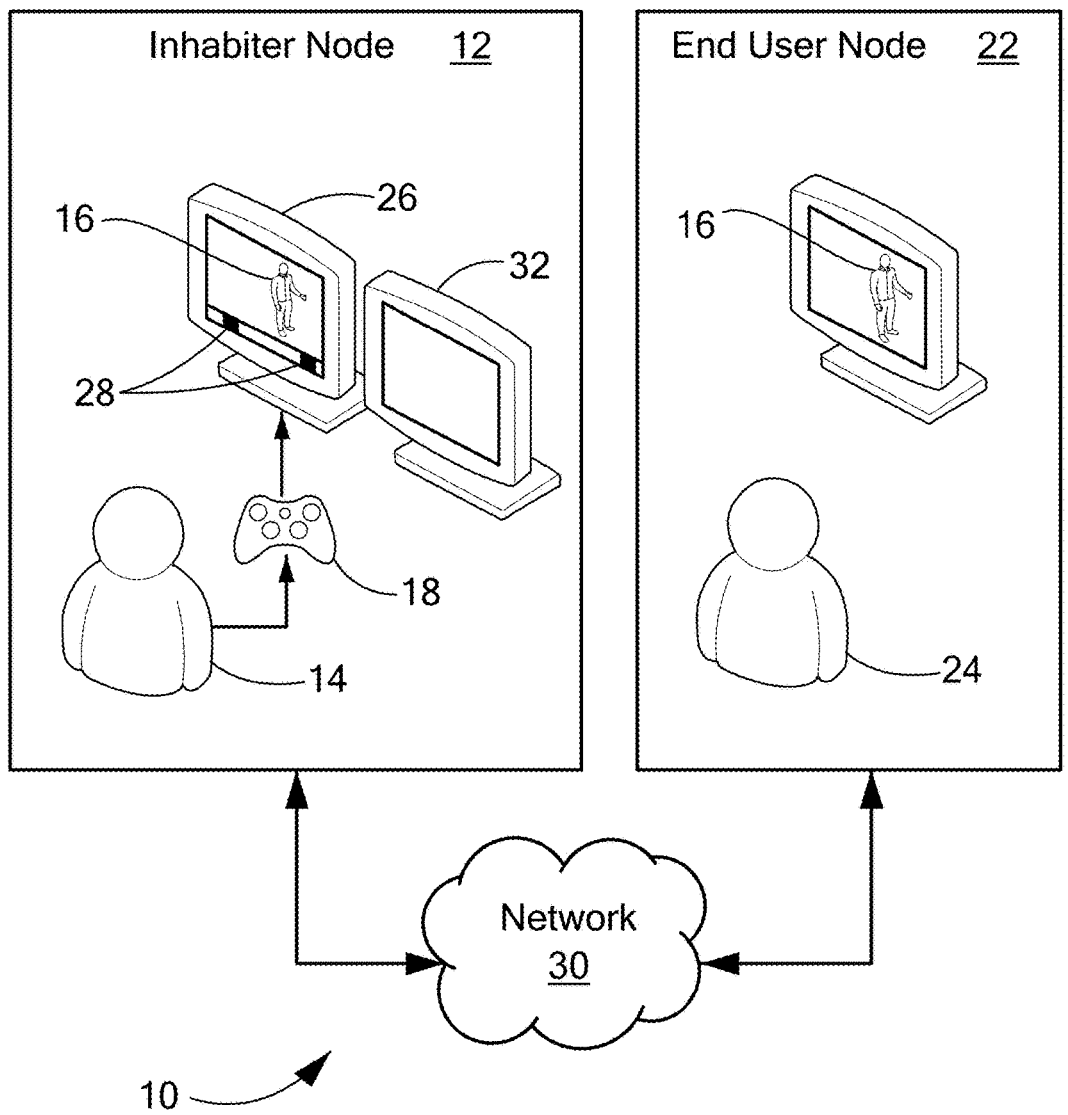
FIG. 1 is a schematic illustration of an embodiment of a system for a real time avatar interaction.

Referring to FIG. 1, a system 10 provides an interactor node 12, at which a human interactor or inhabiter 14 selects and controls a virtual character 16 (also termed "avatar" or "puppet" herein) with one or more input devices 18, and an end user node 22, where a human end user 24, such as a trainee or person to be counseled, can view the avatar 16 as it is controlled by the interactor. The interactor node includes a display 26 on which the interactor can view the avatar that he or she is controlling. The display 26 also includes menus 28, such as radial menus, of various facial expressions, poses, and behaviors of the avatar. The interactor 14 selects a facial expression, pose, or behavior via the input device 18, which is mapped to the menus 28 on the display 26. The end user 24 located at the end user node 22 can view the avatar 16 as it is controlled by the interactor 14. Communication between the interactor node and the end user node can be in any suitable manner, such as over a network 30, for example, a local area network, wide area network, the Internet, and the like. The system can include other elements. For example, a video camera (not shown) located at the end user node can transmit a video of the end user to a further display 32 at the interactor node 12 so that the interactor can see the behavior and reactions of the end user. Microphones (not shown) can be provided to transmit voice communications between the inhabiter and the end user.

Figure 2:
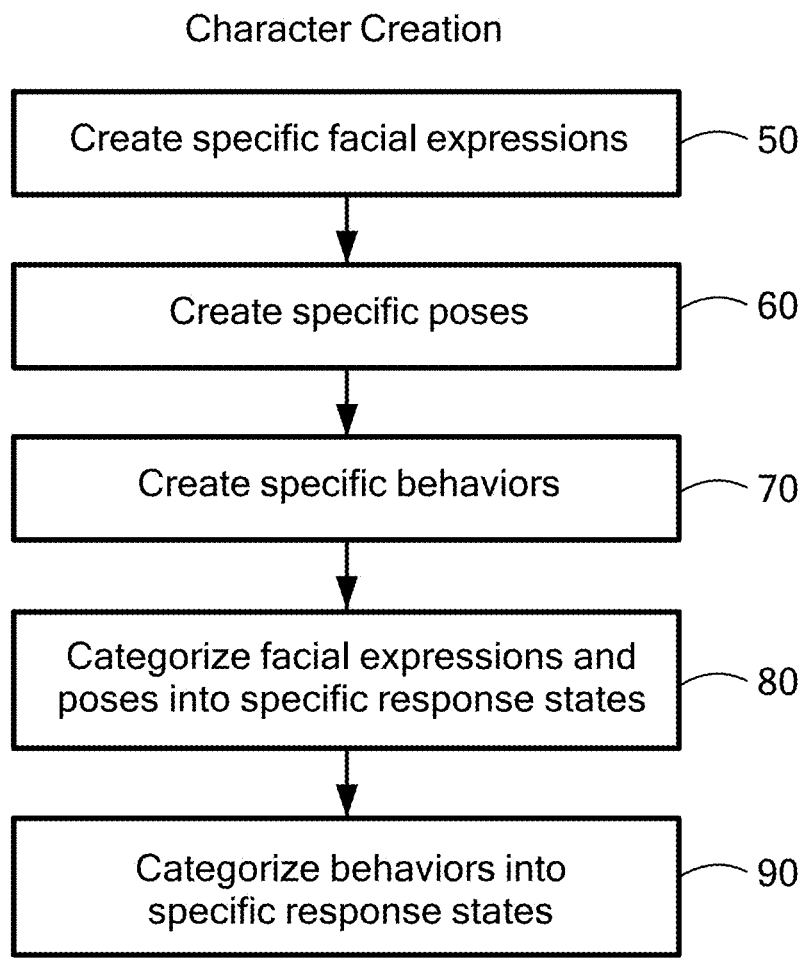
FIG. 2 is a schematic flow chart illustrating the steps of character creation.

Initially, one or more virtual characters or avatars are created and stored in a library of a computer system where they become available for selection by a human interactor for use in a human interaction. Each avatar is created to present a particular emotional and cognitive profile. The avatar is created to have a number of specific facial expressions, specific poses, and specific behaviors. Based on the avatar's emotional and cognitive profile, the facial expressions, poses, and behaviors are categorized into specific response states. The avatar creation process involves a number of steps. See FIG. 2.

In a first step 50, the avatar is created with specific facial expressions. The facial expressions can be created in any suitable manner. In some embodiments, a vertex deformation or blend shapes technique can be used. Reference photographs are captured of a human model's face posing in a variety of predetermined expressions. These expressions can cover a range of human emotions via movements of the eyebrows, eyes, nose, cheeks, and lips. The reference photos are then used as sculpting guides to create three-dimensional counterpart models. A separate 3D model is created for each facial expression.

Figures 3A, 3B:
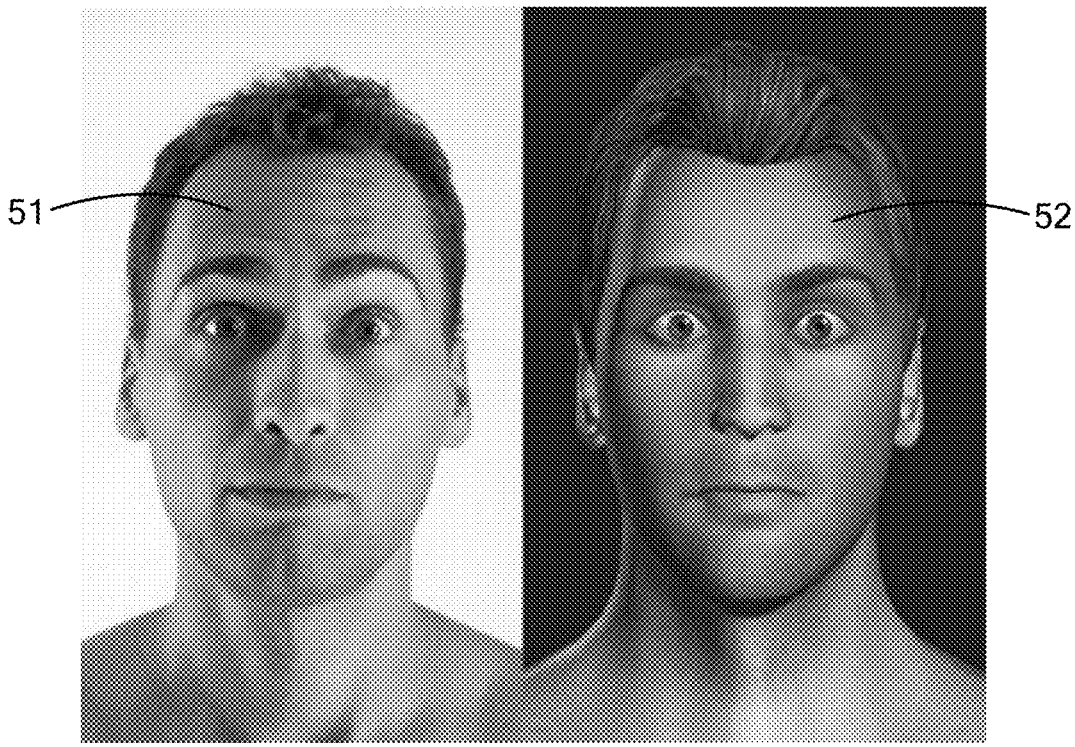
FIG. 3A is a photograph of a human model showing a surprised facial expression.
FIG. 3B is an illustration of a 3D avatar model showing a surprised expression based on the human model in the photograph of FIG. 3A.
Figures 4A, 4B:
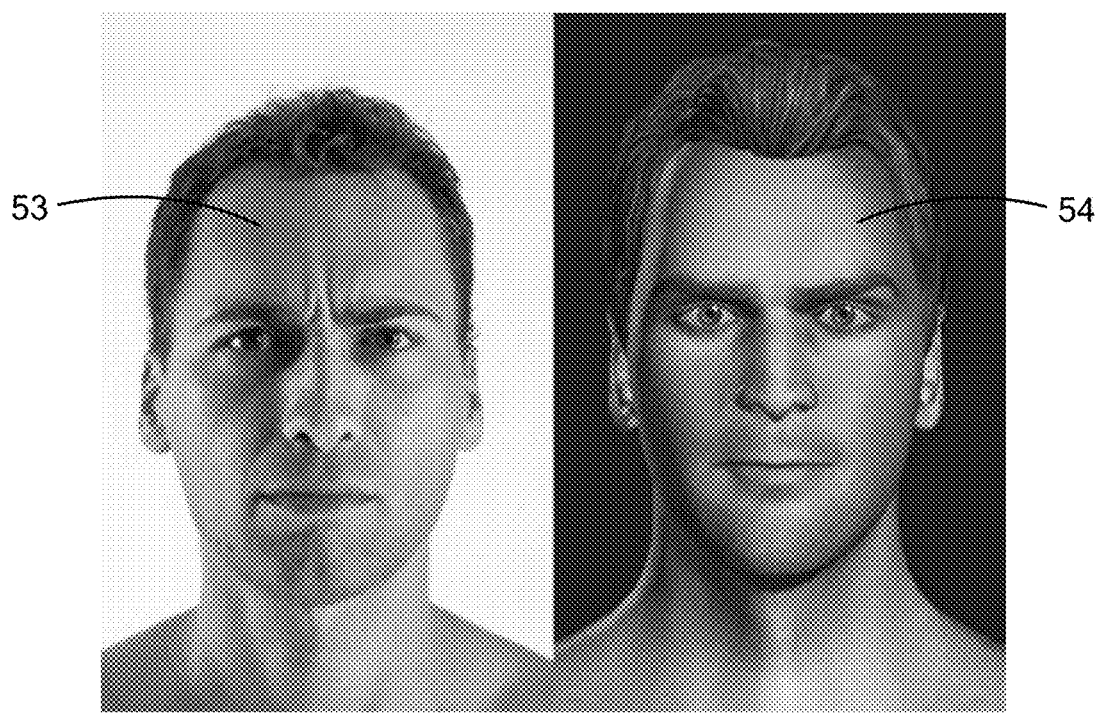
FIG. 4A is a photograph of a human model showing an angry expression.
FIG. 4B is an illustration a 3D avatar model showing an angry expression based on the human model in the photograph of FIG. 4A.

FIG. 3A illustrates a photo of a human model 51 showing a surprised expression and FIG. 3B illustrates a 3D avatar model 52 based on the human model. FIG. 4A illustrates a photo of a human model 53 showing an angry expression and FIG. 4B illustrates a 3D avatar 54 model based on the human model.

Then all of the 3D facial expression avatar models are connected to the primary avatar as morph targets. A program module, such as a script, implements a blend shape animation technique to move from one facial expression to another by interpolating frames between the expressions. This allows the geometry of the original avatar to blend to and from any of the facial expressions, known as blend shapes.

More particularly, the three-dimensional surface geometry of the primary avatar face can be modeled in a neutral position using a polygonal mesh with appropriately located vertex positions. Each of the target facial expressions can be defined by a deformed version of the mesh, in which the vertices are displaced to model the target surface geometry of the face. FIGS. 5A-5C illustrate a 3D avatar model with three facial expressions illustrated by various deformations of a polygonal mesh. A target facial expression can be generated for each desired facial expression.

Figure 6:
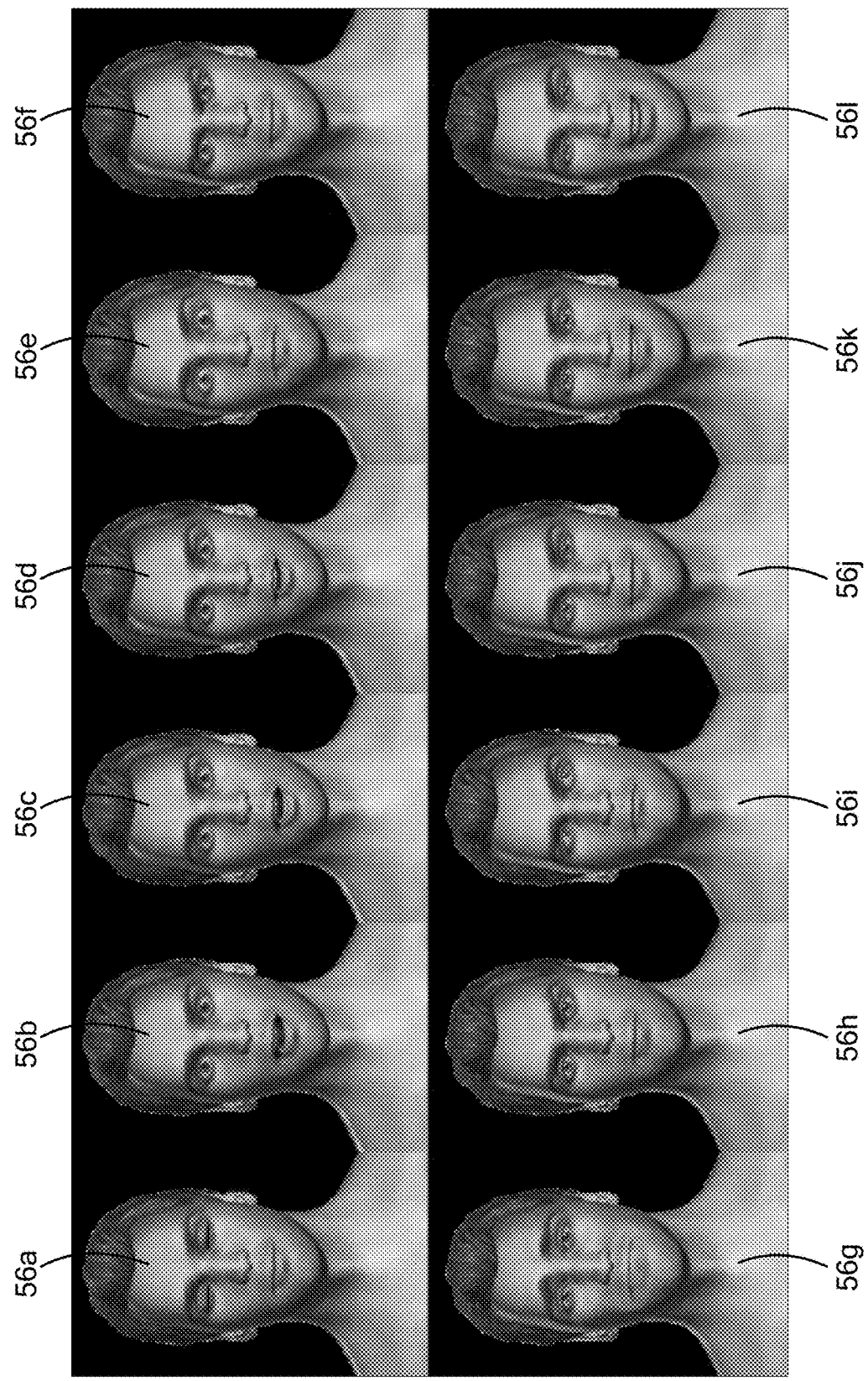
FIG. 6 illustrates a number of exemplary facial expressions of the avatar of FIGS. 3A-5.
Figure 7:
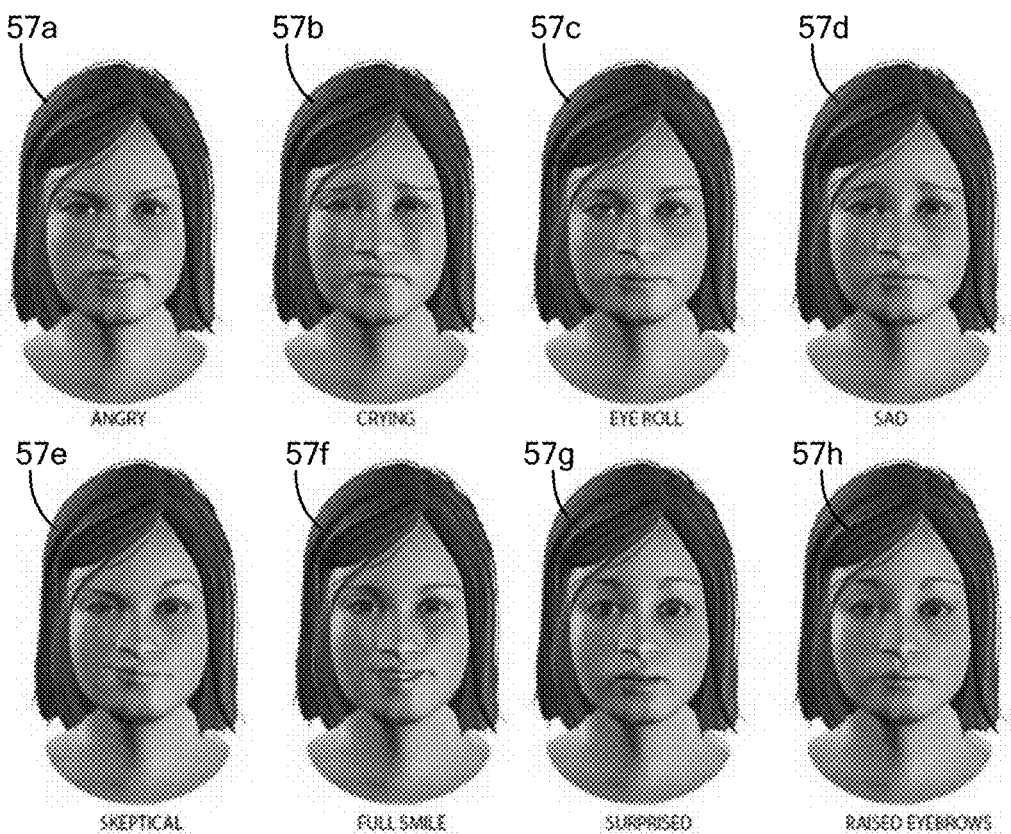
FIG. 7 illustrates a number of exemplary facial expressions of a different avatar.

FIG. 6 illustrates a number of exemplary facial expressions: eyes blinking or closed (56a), three difference variations of an open mouth (56b, 56c, 56d), surprised (56e), angry (56f), crying (56g), concerned (56h), reflective (56i), agreeable (56j), light smile (56k), and full smile (56l). FIG. 7 shows a different avatar assuming a variety of different facial expressions: angry (57a), crying (57b), eye rolling (57c), sad (57d), skeptical (57e), full smile (57f), surprised (57g), raised eyebrows (57h). It will be appreciated that other facial expressions can be provided. The facial expressions for each avatar can be stored in a library available to a user for selection during an interaction, described further below.

The technique described herein to create facial expressions is advantageous in that it allows facial expressions to be created for specific simulation scenarios, such as an interaction with a patient with cranial nerve damage. It will be appreciated that other techniques can, however, be used if desired, such as motion capture techniques, including marker-based and markerless motion capture techniques. Commercially available software, such as Crazy Talk facial animation software, and other facial animation systems such as Faceshift and Facewaretech, can be used.

In a second step 60, specific poses are created for the avatar. This allows an avatar to portray body language that a user can manipulate directly in real time, while a simulation is live. The poses can be created in any suitable manner.

Figure 10:
FIG. 10 is a sequence of five still frames from an exemplary animation of an avatar exhibiting the pose of bringing hands to the face.

In some embodiments, avatar pose animations are created by setting a key frame at the beginning and end of a desired motion and interpolating the in-between motion with a suitable animation or interpolation algorithm, such as is available in many game engines. In particular, live action video is recorded of an actor portraying a specific scenario. The video footage is reviewed and start and end poses are captured as still images. For example, FIGS. 8A and 8B are still images from a video of a live actor 61 raising hands to face. These still images are used as anatomical references to pose a 3D avatar in a like manner. See FIGS. 9A and 9B, which illustrate an avatar 62 in the poses corresponding to FIGS. 8A and 8B. Each pose animation is created separately and added to the avatar's library of available motions for subsequent selection by an inhabiter during an interaction. FIG. 10 illustrates a sequence of still frames from an exemplary animation of an avatar raising hands to face. Subsequently, in an engine, a user can control the forward and backward playback of each animation in order to portray body language in an avatar during a live interaction.

Figure 11:
FIG. 11 illustrates a number of exemplary poses of an avatar.

FIG. 11 shows a variety of different poses that are stored in a library of poses for a particular avatar: agitated (64a), checking phone (64b), arms crossed (64c), crying (64d), face in hands (64e), pointing (64f), shrugging (64g), waving (64h). It will be appreciated that other poses can be provided. The poses for each avatar can be stored in a library available to an inhabiter for selection during an interaction.

In a third step 70, specific behaviors are created for the avatar. Avatar behaviors are full body skeletal animations that allow an avatar to perform a complex motion.

In some embodiments, avatar behaviors can be created by using a motion capture system with a live human performance. The processed motion capture data can be added to the avatar as a behavior, also referred to as an animation.

More particularly, a human performer wearing a motion capture suit is recorded performing complex human motions such as walking, running, jumping, and the like. The motion capture suit is covered with a number of markers that can be detected by one or more cameras for processing by image processing software. Various motion capture systems and techniques can be used. In other embodiments, a marker-less motion capture technique can be used, in which a human performer can move within a designated space. A skeletal frame 72 of the motion is generated. See FIG. 12. The captured skeletal animation data is then separated into individual clips of motion. The data in each clip is analyzed for noise or errors, such as an abrupt, unwanted twitch in motion introduced during the motion capture. The clip is cleaned of noise by removing abnormal spikes in the rotational data of the motion capture skeletal system. FIGS. 13A and 13B illustrate still frames from a skeletal animation of an avatar walking. Each motion is saved as a clip in a library of motions and added into the engine as an avatar behavior for subsequent use by a human inhabiter during a live interaction.

A variety of behaviors for each avatar can be provided, such as, distracted, bored, agitated, concerned, satisfied, elated, attentive, and the like. It will be appreciated that several other such behaviors can be provided.

In a fourth step 80, the various poses and facial expressions of the avatar are categorized into specific response states based on the emotional and cognitive profile of the avatar. In a fifth step 90, the behaviors of the avatar are categorized into specific response states based on the emotional and cognitive profile of the avatar.

The emotive and cognitive profiles can be determined based on the subject matter for which the avatar will be used and can be dependent on the specific goals of a learner in a simulation. Varying the emotional and cognitive profiles of the avatar can result in modifying the effort needed by the learner in achieving the goals in the simulation. The response states, for example, can be categorized broadly into positive, neutral and negative, and the behaviors, poses or facial expressions of an avatar can be classified into each of the above response states based on the subject matter. One or more subject matter experts can determine aspects of the emotions and cognitive profiles and the categorizations into the response states.

Figure 14:
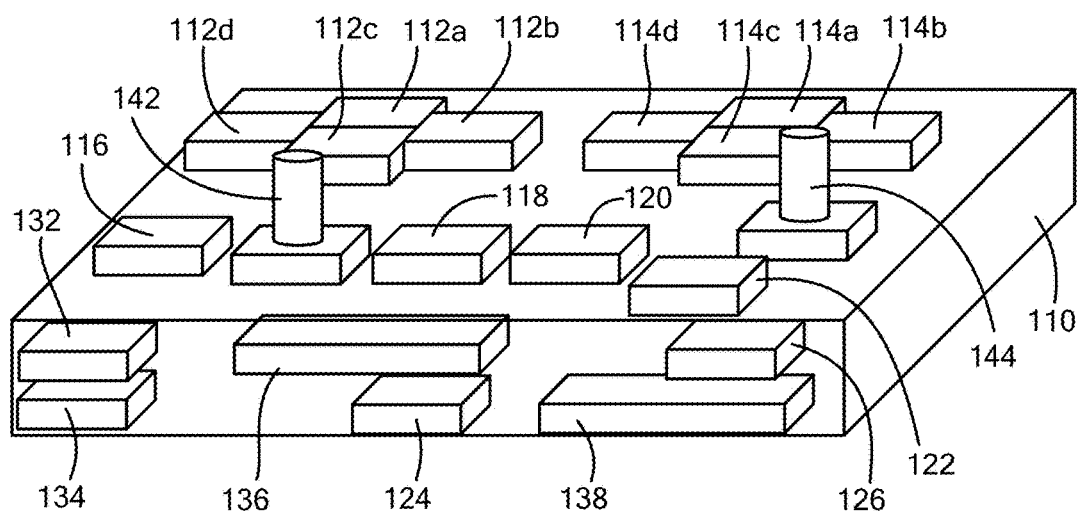
FIG. 14 is a schematic illustration of one embodiment of a user input device.
Figure 15:
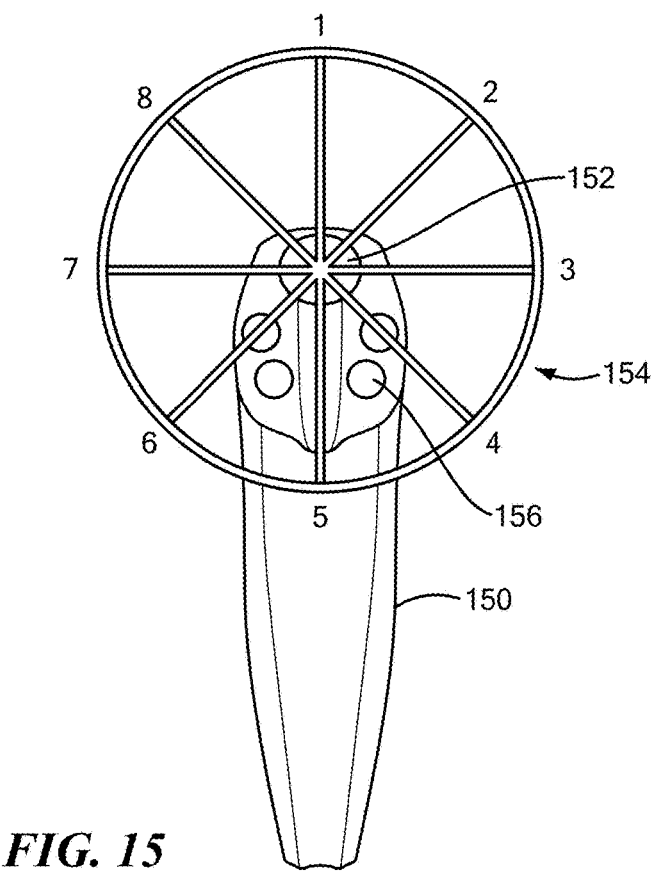
FIG. 15 is a schematic illustration of a further embodiment of a user input device in the form of a joystick.

Once an avatar has been created, it can be made available for a human inhabiter to control. As noted above, the control system 10 can include a user input device 18. The user input device can include a plurality of input elements, such as buttons, control sticks, joysticks, scroll wheels, and the like. FIG. 14 schematically illustrates one embodiment of a user input device that includes a plurality of digital input elements (112a-d, 114a-d, 116, 118, 120, 122, 124, 126), analog input elements (132, 134, 136, 138), and hybrid analog and digital input elements (142, 144), such as control sticks. Devices of this type that can be programmably customized are also commercially available, such as the Xbox Controller from Microsoft. FIG. 15 schematically illustrates a further embodiment of an input device 150 with a radial input element 152 having eight input selections (indicated schematically at 154 in FIG. 15).

Figure 16:
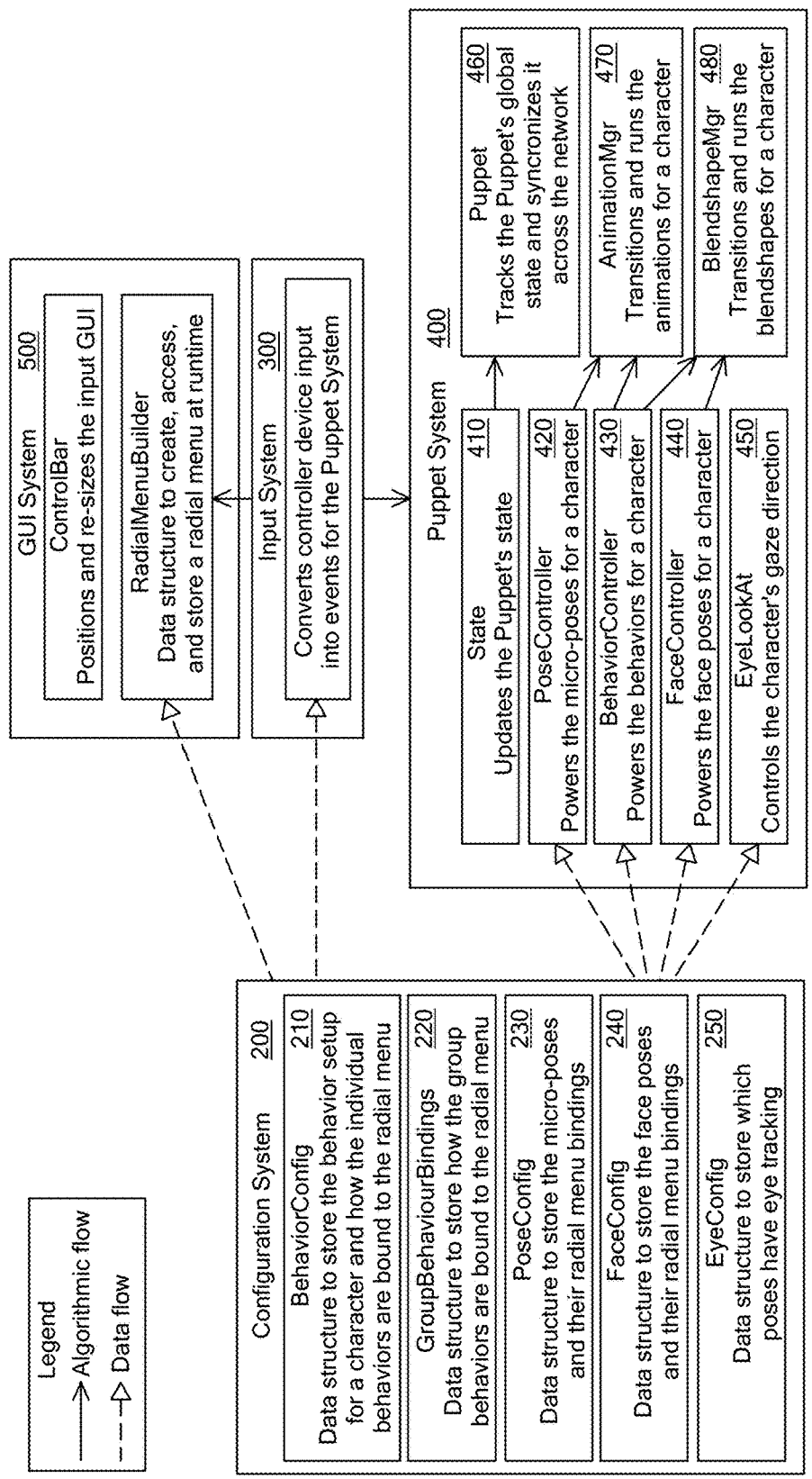
FIG. 16 is a schematic block diagram of an embodiment of a control system.

FIG. 16 is a schematic block diagram illustrating the functionality and communication of the control system. The system includes a configuration system 200, an input system 300, a puppet system 400, and a graphical user interface (GUI) system 500. Each system includes a variety of modules, which can be implemented via suitable programming, for example, scripts, to implement the functionality.

Figure 17:
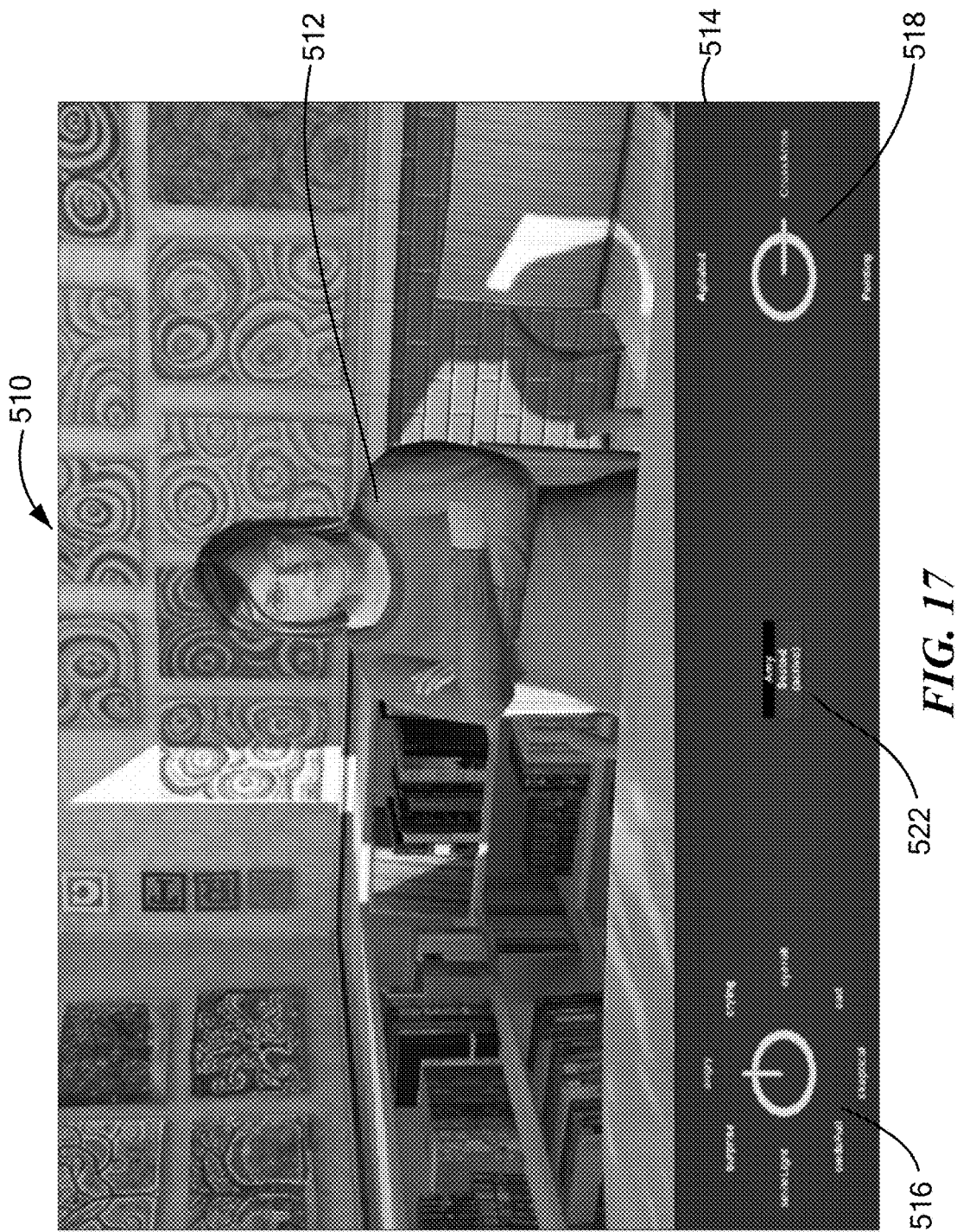
FIG. 17 is an example of a graphical user interface.

The GUI system 500 provides a GUI display 510 for the inhabiter's display device 26 (FIG. 1). The GUI system displays a selected avatar 512 in a scene for control by the inhabiter or interactor. The scene can be provided for selection, for example, based on the simulation chosen by an end user during a training. The GUI also displays a "control bar" 514 that assists the interactor with control of the avatar during a session. An example of a GUI 510 with a control bar 514 across the bottom of the screen is illustrated in FIG. 17. In some embodiments, many of the functions in the system are depicted in a radial menu, and the control bar can accordingly include one or more radial menus. In the embodiment shown, two radial menus 516, 518 are shown on the screen at any given time, one for the left side of the bar and the other for the right side of the bar.

A radial menu is a circular menu in which the different options are bound to a direction instead of a position, in which the direction can be input by, for example, a control stick. In FIG. 17, the control bar 514 at the bottom shows two radial menus 516, 518, one for the face poses or expressions (on the left) and the other for the micro-poses (on the right). At the center of the control bar, status information 522 is provided, such as the name of the avatar (Amy in this example), a behavior (seated), and an indication that the session is active, such that the interactor can view the avatar while they are being controlled.

In some embodiments, referring to FIG. 14, an input device can include one or more control sticks or the like that can be used in conjunction with the radial menus to implement directional inputs to the radial menus. In the example in FIG. 17, the radial menu 516 on the left for facial poses provides a selection of facial expressions: angry, crying, eyeroll, sad, skeptical, smileFull, smileLight, and surprise each at a particular radial direction. By moving the control stick for facial poses (for example, input element 142 in FIG. 14) upwardly on the input device 110, the inhabiter can select the facial pose designated "Angry". As a result, as shown in FIG. 17, the indicator on the radial menu for facial poses points to "Angry," and anger is depicted in Amy's facial expression. Similarly, in this example, the radial menu 518 on the right for the micro-poses provides a selection of micro-poses: Agitated, CrossArms, and Pointing. By moving the control stick for micro-poses (for example, input element 144 in FIG. 14) to the right on the input device, the inhabiter can select the micro-pose designated "CrossArms". The indicator is pointed to "CrossArms," and Amy's arms are depicted as crossed.

In another example, referring to FIG. 15, the input device 150 can be an analog joystick discretized into eight slices (indicated schematically at 154) that can be used to select the various facial expressions. For example, if the joystick input element 152 is pushed between 1 and 2, the facial expression "Angry" is triggered. If the joystick input element is pushed between 2 and 3, the facial expression "Crying" is triggered.

In some embodiments, the interactor can use a control stick while simultaneously activating another input on the input device, such as pressing a button. This can cause a different radial menu to appear with a different selection of menu options. For example, a modifier button 156 on the joystick of FIG. 15 can be pushed to allow the same eight slices to control the poses of the avatar. Thus, with the modifier button held, if the joystick input element 152 is pushed between 1 and 2, the pose "Agitated" is triggered. If the joystick input element is pushed between 2 and 3, the pose "CrossArms" is triggered.

One exemplary set of possible mappings is described with reference to the input device of FIG. 14. For example, each of the buttons 112a-112d can be used to select a different avatar when multiple avatars are available for selection. During an interaction, the control stick 142 can be used to control facial expressions, and the control stick 144 can be used to control poses. The trigger button 138 can be used to control opening and closing of the mouth. The trigger button 136 can be used to control pose animations. The button 122 can be used as a camera toggle. The button 124 can be used as a modifier button to cause the control stick 144 to switch from an individual behavior menu to a group behavior menu, and the button 126 can be used to cause the control stick to control individual behaviors. The button 118 can be used as a deselect all button. In some embodiments, the mappings can be user-configured at runtime. For example, the buttons 114a-114d can be mapped to allow a user to select various emotional and cognitive states or modes of the avatar being controlled. For example, button 114a can be used to select a confrontational mode, which provides a menu that displays poses for depicting an agitated state, arms crossed, or pointing. Button 114b can be used to select a distraught mode, which provides a menu that displays poses for depicting crying, face in hands, and a shrug. Button 114c can be used to select a disengaged mode, which provides a menu that displays a pose for depicting checking a phone. Button 114d can be used to select an engaged mode, which provides a menu that displays poses for depicting waving or resting.

It will be appreciated that any combination of mappings is possible and can be chosen to suit the application and the virtual character rigging.

The input system 300 can control which radial menus are shown and which items are selected on the menu. The input system can also control the conversion of inputs from the input device into events for the puppet system. These events determine which pose (also termed micro-pose), face pose, and behavior is run. The input system can communicate with the GUI system to manipulate one or more radial or other menus that appear on a screen viewed by the inhabiter. The input system can receive data from the configuration system.

The input system 300 can include a mapping of the input device to provide the ability to select among multiple existing avatars in a scene. The input system can also include a mapping of the input device to allow a human to instantaneously choose an emotional or cognitive state of any existing avatar in the scene (achieved via radial-menus or similar). A discretized space can be created for the analog input elements to allow selection of a pose, a behavior, a facial expression, or a combination thereof for any avatar in a scene. The input system can also include a mapping of the input device to trigger the behaviors, poses, facial expressions, or a combination thereof on avatars that are not directly under the control of a human, such as avatars that are controlled by custom artificial intelligence routines.

The puppet system 400 controls the performance of the events that it receives from the input system and synchronizes them across the network. The system includes various modules to implement scripts that directly process and network events (State 410, PoseController 420, BehaviorController 430, FaceController 440, and EyeLookAt 450, illustrated on the left side of the puppet system). The system also includes various modules to implement scripts that properly blend and transition the avatar from one state to another (Puppet 460, AnimationMgr 470, and BlendshapeMgr 480, illustrated on the right side of the puppet system). The State module 410 updates the state of the puppet (the avatar or virtual character). This module utilizes the Puppet module 460, which tracks the puppet's global state and synchronizes the puppet's state across the network. The Pose Controller module 420 powers the micro-poses for a character. This module utilizes the Animation Manager module 470 (AnimationMgr), which transitions and runs animations for the character. The Behavior Controller module 430 powers the behaviors for a character. This module utilizes the Animation Manager module 470 and the Blend Shape Manager module 480, which transitions and runs animations and blendshapes for the character. The Face Controller module 440 powers the face poses for a character, utilizing the Blend Shape manager module 480 to transition and run the blendshapes for the character. The Eye Look At module 450 controls the gaze direction of the character.

The configuration system 200 is a data structure, stored in the system memory, that the other modules can access, as indicated by the dashed lines in FIG. 16. The configuration system stores modules that include scripts that link micro-poses, face poses, and behaviors to their associated animations and blend shapes. In addition, the configuration system includes scripts that determine how the options are bound to the radial menus. The configuration system includes a behavior configuration module 210 (BehaviorConfig) that is a data structure to store the behavior setup for a character and how the individual behaviors are bound to a radial menu. A group behavior bindings module 220 (GroupBehaviorBindings) is a data structure to store how group behaviors are bound to a radial menu. Group behaviors determine the actions of multiple avatars in a simulation; for example, a classroom of students all raising their hands to answer a question is a group behavior. A pose configuration module 230 (PoseConfig) is a data structure to store the micro-poses and their radial menu bindings. A face configuration module 240 (FaceConfig) is a data structure to store the face poses and their radial menu bindings. An eye configuration module 250 (EyeConfig) is a data structure to store which poses have eye tracking.

Figure 18:
FIG. 18 is an example of a script for a facial pose configuration object.

The configuration system in module 210 binds each micro-pose, facial expression and behavior onto a particular radial menu with a particular direction, represented as a positive angle in degrees. When the pose set for a particular character is created (as described above), these configuration objects are populated with the desired values. An example of a face pose configuration object is shown in FIG. 18.

When the control stick is displaced by the interactor in a particular direction, its positional coordinates are converted into polar coordinates as shown below:

$$squareMagnitude = x^2 + y^2$$

$$direction = atan\ 2(-y, -x) + 180$$

The x and y variables are the rectangular coordinates of the control stick. The squareMagnitude is the square of the magnitude of x and y, because it is faster to use the square magnitude rather than the real magnitude. The direction is the angle in degrees of the control stick. 180 degrees is added to the calculation so that the angle value is always positive.

When the square magnitude exceeds a particular threshold, the system updates the direction of the radial menu. In some embodiments, 0.6 is a satisfactory threshold value, but other values can be used. When the square magnitude is below the threshold, the radial menu continues to point at the last applied direction.

The direction of the control stick is then mapped to a particular option on the radial menu. This is done by performing a binary search for the option with the angle value closest to the one direction of the control stick. The resulting option then becomes the output of the radial menu.

In some embodiments, the individual behavior and group behavior radial menus require the interactor to press a modifier button and use the control stick simultaneously. While the modifier button is depressed, one of the original radial menus (pose wheel for group behaviors and face wheel for individual behaviors) is replaced with the appropriate behavior wheel. In some embodiments, once the modifier button is released the behavior wheel disappears. In other embodiments, the original wheel does not appear again until the square magnitude of the control stick drops below a particular value. In some embodiments, 0.1 is a satisfactory value. This prevents the interactor from accidentally selecting an option on the original radial menu when the modifier is released.

In some embodiments, in addition to the radial menus, the interactor can utilize two one dimensional analog triggers to control the severity of the mouth motion and the time position of the running micro-pose, for example, using triggers 136, 138 on the control input device 110. Both of these inputs can have a velocity clamp applied to them to prevent the user from changing the character too quickly. More particularly, $$maxChange = (deltaTime)(maxVelocity)$$

and $$\text{lastTrigger} - \text{maxChange if last Trigger} - \text{raw Trigger} > \text{maxChange}$$

$$\text{trigger} = \text{lastTrigger} + \text{maxChange if raw Trigger} - \text{lastTrigger} > \text{maxChange}$$

$$\text{rawTrigger otherwise}$$

where:
trigger is the clamped trigger value,
lastTrigger is the trigger value on the last frame,
rawTrigger is the trigger value directly from the device,
deltaTime is the time between the previous and the current frame, and
maxVelocity is the maximum allowed rate of change of the trigger.

Blend shape transitions can be handled by decreasing the weight of all deactivated blend shapes at a constant velocity while increasing the weight of all active blend shapes at a constant velocity. Different blend shapes can, however, have different velocities associated with them. For example, the blink blend shape can have a very fast velocity compared to the smile blend shape.

The mouth blend shape is slightly more complicated because there are different variants of the mouth motion blend shapes. In some embodiments, when the weight of the blend shape is close to 0, the system randomly picks a new mouth open blend shape. Once the mouth open shape becomes activated, the system retains the last selected mouth shape until its weight reaches 0. Using this technique, it is possible to create a more varied and natural look to the mouth open facial expression.

In some embodiments, animation transitions can be handled through a "cross face" operation, in which each joint is linear driven over a period of time from the old animation to the new animation position. More particularly, the weight of the exiting animation is decreased while the weight of the entering animation is increased at the same speed. Occasionally, a transition from one point of an animation to the same point of another animation is needed. When this occurs, the system can make a copy of the animation clip and use the same "cross facing" technique to make the transition.

When certain animations are run, the system automatically directs the eye gaze of the virtual character. This can be done by establishing a point in three-dimensional space where the character should focus. In some embodiments, this point can be determined by using the position of a camera (not shown) at the interactor node. In other embodiments, this point can be determined by using a per-defined point in the world. In some embodiments, the system can employ both modes. A button 122 can be used to toggle between these two modes.

To compute the orientation of the eyes, a lookAt vector is first constructed for each eye.

$$\text{lookAt} = \text{normalize}(\text{targetPosition} - \text{eyePosition})$$

The vector lookAt represents the directions in which an eye should gaze while the targetPosition is the eye gaze target and the eyePosition is the position of the eyes.

A quaternion is then constructed that rotates from (0,0,0) to the lookAt vector, assuming the up vector is world space up vector (0,1,0). This quaternion is then applied to the eye rotation as follows:

$$\text{eyeRotation} = (\text{lookAtRotation})(\text{reference})$$

where:
eyeRotation is the rotation of the eyes,
lookAtRotation is the rotation due to the lookAt vector, and
reference is the rotation of the eyes when they look straight ahead.

After computing the orientation, the eye direction is clamped into a circular region, for example, so that they cannot roll back into the head. This is achieved by linearly interpolating the orientation of the head to the computed eye rotation by the radius of the circular region.

With this system, a real time (live) interaction can occur between a human inhabiter at one location and an end user at another location. Real time refers to an interaction with minimal or no noticeable delay in the exchange of information (audio, video, avatar motions and simulation state) between two active users (interactor and end user). Thus, the system can display to the interactor and to the end user the motions of the avatar in a generally realistic time frame so that live human interaction can be facilitated. The avatar or virtual character can be controlled by the inhabiter to simulate a realistic, sensitive encounter. A large spectrum of human facial expressions, behaviors, and emotional and cognitive profiles can be recreated. In this manner, the system can provide a level of realism with the avatar to facilitate the interaction.

The control system for virtual characters as described herein can be part of a computer system that executes programming for the functionalities described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, scripts, programs, drivers, objects, components, data structures, and the like that perform particular tasks or operate on data.

Program code for carrying out operations for aspects of the present invention may be written in any combination of one or more programming languages, including an object oriented programming language such as Java, C#, C++, and the like and conventional procedural programming languages, such as the "C" programming language or similar programming languages. Rendering of visual data, such as virtual characters, avatars, or puppets, on two dimensional displays can be done directly, through low-level libraries such as OPENGL and DIRECTX3D, or through higher-level graphics and gaming engines, such as OGRE3D or UNITY3D.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, monitors, scanners, speakers, and printers. Interfaces can include, without limitation, universal serial bus (USB) ports, serial ports, parallel ports, game ports, and the like. Display devices can include without limitation monitors, laptop displays, tablet displays, smartphone displays, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), and integration platform as a service (IPaaS).

Embodiments of the invention include the following:
1. A system for controlling a virtual character, comprising:
one or more processors and memory, the memory including a stored library comprising a plurality of facial expressions, a plurality of poses, and a plurality of behaviors associated with a virtual character;
machine-readable instructions stored in the memory that, upon execution by the one or more processors cause the system to carry out operations comprising:
selecting, for the virtual character, one or more of a facial expression, a pose, and a behavior, and
displaying, on a display device in real time, movement of the virtual character from a prior position to a position exhibiting the selected one or more facial expression, pose, and behavior; and
an input device comprising one or more input elements mapped to selections from one or more of the plurality of facial expressions, the plurality of poses, and the plurality of behaviors associated with the virtual character.
2. The system of embodiment 1, wherein at least one input element of the input device comprises a control stick movable in radial directions, each radial direction mapped to a selection from one of the plurality of facial expressions, the plurality of poses, or the plurality of behaviors associated with the virtual character.
3. The system of embodiment 2, wherein radial directions of the control stick are discretized into spaces, each space mapped to a selection from one of the plurality of facial expressions, the plurality of poses, or the plurality of behaviors associated with the virtual character.
4. The system of any of embodiments 1-3, wherein the operations further comprise displaying a menu on the display device, the menu listing selections from one of the plurality of facial expressions, the plurality of poses, and the plurality of behaviors associated with a virtual character.
5. The system of embodiment 4, wherein the menu comprises a radial menu, and each selection on the radial menu is bound to a direction.
6. The system of embodiment 5, wherein the input device comprises at least one control stick movable in radial directions, wherein the radial directions of the control stick are mapped to a corresponding direction on the radial menu, wherein movement of the control stick in one of the radial directions moves a pointer on the radial menu to the selection bound to the corresponding direction on the radial menu.

7. The system of embodiment 6, wherein the mapping includes converting rectangular positional coordinates of the control stick into polar coordinates of the radial menu.

8. The system of embodiment 7, further comprising moving the pointer on the radial menu to a new direction when a square magnitude of the rectangular positional coordinates of the control stick exceeds a determined threshold.

9. The system of any of embodiments 1-8, wherein the input device comprises one or more input elements, at least one input element configured to select one of a plurality of menus for display on the display device, the plurality of menus includes a menu listing the plurality of facial expressions, a menu listing the plurality of poses, and a menu listing the plurality of behaviors associated with a virtual character.

10. The system of embodiment 9, wherein the input device includes two input elements configured so that simultaneous activation of the two elements selects a different menu for display on the display device.

11. The system of any of embodiments 1-10, further comprising, selecting one or more of a further facial expression, a further pose, and a further behavior, and displaying on the display device in real time movement of the virtual character to the selected one or more further facial expression, further pose, and further behavior.

12. The system of any of embodiments 1-11, wherein the memory further includes a stored library comprising a plurality of virtual characters, each virtual character associated with a cognitive and emotional profile, and the operations include selecting one of the virtual characters for display on the display device.

13. The system of any of embodiments 1-12, wherein the operations further comprise applying a velocity clamp to prevent movement of the virtual character from changing too quickly.

14. The system of any of embodiments 1-13, wherein movement of the virtual character to a new position is provided by an animation, stored in the memory, of the virtual character moving from a prior position to a selected position, the animation providing a change in pose or a change in behavior of the virtual character.

15. The system of embodiment 14, further comprising moving a joint of a virtual character from a prior animation position to a new animation position.

16. The system of any of embodiments 14-15, wherein a weight of an exiting animation is decreased while a while a weight of an entering animation is increased.

17. The system of any of embodiments 1-16, wherein movement of a virtual character from a selected facial position to a new facial expression comprises a transition of a plurality of blend shapes.

18. The system of embodiment 17, wherein in the transition from the selected facial expression to the new facial expression, deactivated blend shapes are weighted to decrease at a constant velocity and active blend shapes are weighted to increase at a constant velocity.

19. The system of any of embodiments 17-18, wherein different blend shapes are weighted to increase or decrease at different velocities.

20. The system of any of embodiments 17-19, wherein in the transition from the selected facial expression to a new facial expression with a different mouth shape, a last selected mouth shape is retained until its weigh reaches about 0.

21. The system of any of embodiments 1-20, wherein the input device comprises a further input element configured to control mouth motion of the virtual character.

22. The system of any of embodiments 1-21, wherein the input device comprises a further input element configured to control timing of the movement of the virtual character.

23. The system of any of embodiments 1-22, wherein the input device comprises a hand held controller or joystick.

24. The system of any of embodiments 1-23, wherein the display device and the input device are located at an interactor node, and a further display device is provided at an end user node located remotely from the interactor node and in communication with the one or more processors to receive a display of the movement of the virtual character.

25. The system of any of embodiments 1-24, wherein the virtual character is displayed on the end user node display device in real time.

26. A method for controlling a virtual character, comprising:
displaying a virtual character on an interactor node display device and on an end user display device;
at an interactor node including one or more processors and memory, selecting one or more of a facial expression, a pose, and a behavior for the virtual character; and
displaying, on the interactor node display device and the end user display device, movement of the virtual character from a prior position to a position exhibiting the selected one or more of the facial expression, the pose, and the behavior.

27. The method of embodiment 26, further comprising displaying a menu on the interactor node display device, the menu listing selections from one of the plurality of facial expressions, the plurality of poses, and the plurality of behaviors associated with a virtual character.

28. The method of embodiment 27, further comprising activating an input element on an input device to select a selection on the menu displayed on the interactor node display device.

29. The method of embodiment 28, wherein the menu comprises a radial menu, and each selection on the radial menu is bound to a direction, and wherein the input device includes at least one control stick movable in radial directions each mapped to a corresponding selection on the radial menu.

30. The method of embodiment 29, wherein the mapping includes converting rectangular positional coordinates of the control stick into polar coordinates of the radial menu.

31. The method of any of embodiments 29-30, further comprising moving a pointer on the radial menu to a new direction when a square magnitude of the rectangular positional coordinates of the control stick exceeds a determined threshold.

32. The method of any of embodiments 28-31, wherein the input device includes two input elements configured so that simultaneous activation of the two elements selects a different menu for display on the display device.

33. The method of any of embodiments 28-32, wherein the input device comprises a further input element configured to control mouth motion of the virtual character.

34. The method of any of embodiments 28-33, wherein the input device comprises a further input element configured to control timing of the movement of the virtual character.

35. The method of any of embodiments 28-34, wherein the input device comprises a hand held controller or joystick.

36. The method of any of embodiments 28-35, wherein the display device and the input device are located at an interactor node, and a further display device is provided at an end user node located remotely from the interactor node and in communication with the one or more processors to receive a display of the movement of the virtual character.

37. The method of any of embodiments 26-36, further comprising, selecting one or more of a further facial expression, a further pose, and a further behavior, and displaying on the display device in real time movement of the virtual character to the selected one or more further facial expression, further pose, and further behavior.

38. The method of any of embodiments 26-37, wherein the memory further includes a stored library comprising a plurality of virtual characters, each virtual character associated with a cognitive and emotional profile, and the operations include selecting one of the virtual characters for display on the display device.

39. The method of any of embodiments 26-38, further comprising applying a velocity clamp to prevent movement of the virtual character from changing too quickly.

40. The method of any of embodiments 26-39, wherein movement of the virtual character to a new position is provided by an animation, stored in the memory, of the virtual character moving from a prior position to a selected position, the animation providing a change in pose or a change in behavior of the virtual character.

41. The method of embodiment 40, further comprising moving a joint of a virtual character from a prior animation position to a new animation position.

42. The method of any of embodiments 40-41, further comprising decreasing a weight of an exiting animation while increasing a while a weight of an entering animation.

43. The method of any of embodiments 26-42, wherein movement of a virtual character from a selected facial position to a new facial expression comprises a transition of a plurality of blend shapes.

44. The method of embodiment 43, wherein in the transition from the selected facial expression to the new facial expression, weighting deactivated blend shapes to decrease at a constant velocity and weighting active blend shapes to increase at a constant velocity.

45. The method of embodiment 44, wherein different blend shapes are weighted to increase or decrease at different velocities.

46. The method of any of embodiments 43-45, wherein in the transition from the selected facial expression to a new facial expression with a different mouth shape, a last selected mouth shape is retained until its weigh reaches about 0.

47. The method of any of embodiments 26-46, wherein the virtual character is displayed on the end user node display device in real time.

48. The method of any of embodiments 26-47, further comprising creating a virtual character for a system for virtual character interaction, comprising:
   creating a virtual character with an emotional and cognitive profile;
   creating a set of facial expressions for the virtual character;
   creating a set of poses for the virtual character;
   creating a set of behaviors for the virtual character;
   categorizing the facial expressions, poses, and behaviors into response states based on the emotional and cognitive profile of the virtual character; and
   storing the sets of facial expressions, poses, and behaviors in a non-transitory computer memory.

49. The method of embodiment 48, wherein the step of creating the set of facial expressions comprises:
   providing a plurality of reference photographs of a human model's face posing in a variety of predetermined expressions;
   create a model of a face of the virtual character with a polygonal mesh based on a neutral facial expression; and
   blending the neutral facial expression into a target facial expression by deforming vertices of the polygonal mesh from the neutral facial expression to the target facial expression.

50. The method of any of embodiments 49, wherein the step of blending the neutral facial expression into the target facial expression uses a blend shapes algorithm.

51. The method of any of embodiments 48-50, wherein the step of creating the set of poses comprises:
   recording a live action video of a human actor performance;
   determining start and end poses from still images of the video recording; and
   generating an animation of the virtual character by interpolating between the start and end poses.

52. The method of any of embodiments 48-51, wherein the step of creating the set of behaviors comprises:
   providing a video recording of a human performance of a behavior; and
   generating a skeletal frame animation from the video recording.

53. A method of creating a virtual character for a system for virtual character interaction, comprising:
   creating a virtual character with an emotional and cognitive profile;
   creating a set of facial expressions for the virtual character;
   creating a set of poses for the virtual character;
   creating a set of behaviors for the virtual character;
   categorizing the facial expressions, poses, and behaviors into response states based on the emotional and cognitive profile of the virtual character; and
   storing the sets of facial expressions, poses, and behaviors in a non-transitory computer memory.

54. The method of embodiment 53, wherein the step of creating the set of facial expressions comprises:
   providing a plurality of reference photographs of a human model's face posing in a variety of predetermined expressions;
   create a model of a face of the virtual character with a polygonal mesh based on a neutral facial expression; and
   blending the neutral facial expression into a target facial expression by deforming vertices of the polygonal mesh from the neutral facial expression to the target facial expression.

55. The method of any of embodiments 54, wherein the step of blending the neutral facial expression into the target facial expression uses a blend shapes algorithm.

56. The method of any of embodiments 53-55, wherein the step of creating the set of poses comprises:
   recording a live action video of a human actor performance;
   determining start and end poses from still images of the video recording; and
   generating an animation of the virtual character by interpolating between the start and end poses.

57. The method of any of embodiments 53-56, wherein the step of creating the set of behaviors comprises:
   providing a video recording of a human performance of a behavior; and
   generating a skeletal frame animation from the video recording.

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A system for controlling a virtual character, comprising:
   one or more processors and memory located at an interactor node, the memory including a stored library comprising a plurality of facial expressions, a plurality of poses, and a plurality of behaviors associated with a virtual character; and
   an input device in communication with the one or more processors and comprising input elements mapped to the plurality of facial expressions, the plurality of poses, and the plurality of behaviors associated with the virtual character, the input elements selectable by a user to select a facial expression, a pose, and a behavior for the virtual character;
   wherein the one or more processors are operable, via machine-readable instructions stored in the memory, to:
      display a menu on a display device located at the interactor node, the menu listing selections from one of the plurality of facial expressions, the plurality of poses, and the plurality of behaviors associated with a virtual character,
      receive from the input device at the interactor node one or more of a user-selected facial expression, a user-selected pose, and a user-selected behavior for the virtual character selected from the menu via the mapped input elements,
      provide in real time an animation of movement of the virtual character from a prior position to a position exhibiting the one or more user-selected facial expression, user-selected pose, and user-selected behavior, and
      display in real time, on the display device located at the interactor node and on a further display device located at an end user node located remotely from the interactor node, the movement of the virtual character from the prior position to the position exhibiting the one or more user-selected facial expression, user-selected pose, and user-selected behavior.

2. The system of claim 1, wherein at least one input element of the input device comprises a control stick movable in radial directions, each radial direction mapped to a selection from one of the plurality of facial expressions, the plurality of poses, or the plurality of behaviors associated with the virtual character.

3. The system of claim 2, wherein radial directions of the control stick are discretized into spaces, each space mapped to a selection from one of the plurality of facial expressions, the plurality of poses, or the plurality of behaviors associated with the virtual character.

4. The system of claim 1, wherein the menu comprises a radial menu, and each selection on the radial menu is bound to a direction.

5. The system of claim 4, wherein the input device comprises at least one control stick movable in radial directions, wherein the radial directions of the control stick are mapped to a corresponding direction on the radial menu, wherein movement of the control stick in one of the radial directions moves a pointer on the radial menu to the selection bound to the corresponding direction on the radial menu.

6. The system of claim 5, wherein the mapping includes converting rectangular positional coordinates of the control stick into polar coordinates of the radial menu.

7. The system of claim 6, further comprising moving the pointer on the radial menu to a new direction when a square magnitude of the rectangular positional coordinates of the control stick exceeds a determined threshold.

8. The system of claim 1, wherein the input elements of the input device comprise at least one input element configured to select one of a plurality of menus for display on the display device, the plurality of menus includes a menu listing the plurality of facial expressions, a menu listing the plurality of poses, and a menu listing the plurality of behaviors associated with a virtual character.

9. The system of claim 8, wherein the input device includes two input elements configured so that simultaneous activation of the two elements selects a different menu for display on the display device.

10. The system of claim 1, further comprising, selecting one or more of a further facial expression, a further pose, and a further behavior, and displaying on the display device in real time movement of the virtual character to the selected one or more further facial expression, further pose, and further behavior.

11. The system of claim 1, wherein the memory further includes a stored library comprising a plurality of virtual characters, each virtual character associated with a cognitive and emotional profile, and the operations include selecting one of the virtual characters for display on the display device.

12. The system of claim 1, wherein the operations further comprise applying a velocity clamp to prevent movement of the virtual character from changing too quickly.

13. The system of claim 1, wherein movement of the virtual character to a new position is provided by an animation, stored in the memory, of the virtual character moving from a prior position to a selected position, the animation providing a change in pose or a change in behavior of the virtual character.

14. The system of claim 13, further comprising moving a joint of a virtual character from a prior animation position to a new animation position.

15. The system of claim 13, wherein a weight of an exiting animation is decreased while a while a weight of an entering animation is increased.

16. The system of claim 1, wherein movement of a virtual character from a selected facial position to a new facial expression comprises a transition of a plurality of blend shapes.

17. The system of claim 16, wherein in the transition from the selected facial expression to the new facial expression, deactivated blend shapes are weighted to decrease at a constant velocity and active blend shapes are weighted to increase at a constant velocity.

18. The system of claim 16, wherein different blend shapes are weighted to increase or decrease at different velocities.

19. The system of claim 16, wherein in the transition from the selected facial expression to a new facial expression with a different mouth shape, a last selected mouth shape is retained until its weight reaches about 0.

20. The system of claim 1, wherein the input device comprises a further input element configured to control mouth motion of the virtual character.

21. The system of claim 1, wherein the input device comprises a further input element configured to control timing of the movement of the virtual character.

22. The system of claim 1, wherein the input device comprises a hand held controller or joystick.

23. A method for controlling a virtual character, comprising:
displaying a virtual character on a display device located at an interactor node and on an end user display device located remotely from the interactor node;
displaying a menu on the interactor node display device, the menu listing selections from one of a plurality of facial expressions, a plurality of poses, and a plurality of behaviors associated with the virtual character;
at the interactor node including one or more processors and memory, receiving, from a user input device, one or more of a user-selected facial expression, a user-selected pose, and a user-selected behavior for the virtual character selected from the menu;
providing an animation of movement of the virtual character from a prior position to a position exhibiting the one or more user-selected facial expression, user-selected pose, and user-selected behavior; and
displaying, on the interactor node display device and the end user display device, the movement of the virtual character in real time from a prior position to a position exhibiting the one or more user-selected facial expression, user-selected pose, and user-selected behavior.

24. The method of claim 23, further comprising activating an input element on an input device to select a selection on the menu displayed on the interactor node display device.

25. The method of claim 24, wherein the menu comprises a radial menu, and each selection on the radial menu is bound to a direction, and wherein the input device includes at least one control stick movable in radial directions each mapped to a corresponding selection on the radial menu.

26. The method of claim 23, further comprising selecting the virtual character from among a plurality of virtual characters stored in memory.

27. A method of creating a virtual character for a system for virtual character interaction, comprising:
creating, at a computer comprising one or more processors and a non-transitory computer-readable memory, a virtual character with an emotional and cognitive profile, further comprising:
creating a set of facial expressions for the virtual character comprising capturing an image of each facial expression and storing each facial expression in a library of facial expressions in the non-transitory computer-readable memory;
creating a set of poses for the virtual character comprising creating an animation for each pose from a sequence of video images and storing each animation in a library of poses in the non-transitory computer-readable memory;
creating a set of behaviors for the virtual character comprising capturing each behavior with a motion capture system, separating each behavior into one or more motion clips, and storing each clip in a library of motions in the non-transitory computer-readable memory; and
categorizing the facial expressions, poses, and behaviors into response states based on the emotional and cognitive profile of the virtual character and storing the response states in the non-transitory computer-readable memory,
wherein the libraries and the responses states are stored in a configuration system of the computer in communication with an input system, and each facial expression, pose, and behavior is bound to a selection of the input system for selection by a user.

28. The method of claim 27, wherein the step of creating the set of facial expressions further comprises:
providing a plurality of reference photographs of a human model's face posing in a variety of predetermined expressions;
create a model of a face of the virtual character with a polygonal mesh based on a neutral facial expression; and
blending the neutral facial expression into a target facial expression by deforming vertices of the polygonal mesh from the neutral facial expression to the target facial expression.

29. The method of claim 28, wherein the step of blending the neutral facial expression into the target facial expression uses a blend shapes algorithm.

30. The method of claim 27, wherein the step of creating the set of poses further comprises:
recording a live action video of a human actor performance;
determining start and end poses from still images of the video recording; and
generating the animation of the virtual character by interpolating between the start and end poses.

31. The method of claim 27, wherein the step of creating the set of behaviors further comprises:
providing a video recording of a human performance of a behavior; and
generating a skeletal frame animation from the video recording.

* * * * *